(12) United States Patent
Kim et al.

(10) Patent No.: US 8,131,704 B2
(45) Date of Patent: Mar. 6, 2012

(54) METHOD AND SYSTEM FOR MANAGING SEARCH MEDIATION INFORMATION

(75) Inventors: DongWook Kim, Seongnam (KR); Sun Bae Kim, Seoul (KR); Ji Yeon Lee, Seoul (KR)

(73) Assignee: NHN Corporation, Seongnam-si (KR)

( * ) Notice: Subject to any disclaimer, the term of this patent is extended or adjusted under 35 U.S.C. 154(b) by 648 days.

(21) Appl. No.: 12/293,157

(22) PCT Filed: Mar. 13, 2007

(86) PCT No.: PCT/KR2007/001214
§ 371 (c)(1),
(2), (4) Date: Sep. 16, 2008

(87) PCT Pub. No.: WO2007/105899
PCT Pub. Date: Sep. 20, 2007

(65) Prior Publication Data
US 2009/0055372 A1    Feb. 26, 2009

(30) Foreign Application Priority Data
Mar. 16, 2006    (KR) .................. 10-2006-0024278

(51) Int. Cl.
G06F 17/30    (2006.01)
(52) U.S. Cl. ...................... 707/706; 707/758
(58) Field of Classification Search .......... 707/706, 707/758
See application file for complete search history.

(56) References Cited

U.S. PATENT DOCUMENTS

| 5,684,985 A * | 11/1997 | Ahmadi ........................ 1/1 |
| 2004/0006708 A1* | 1/2004 | Mukherjee et al. ......... 713/201 |
| 2005/0198068 A1* | 9/2005 | Mukherjee et al. ........ 707/104.1 |
| 2007/0011170 A1* | 1/2007 | Hackworth ................. 707/10 |
| 2007/0168552 A1* | 7/2007 | Alse et al. ................. 709/245 |

FOREIGN PATENT DOCUMENTS

| JP | 2001-249933 | 9/2001 |
| JP | 2002-198997 | 7/2002 |
| JP | 2004-206517 | 7/2004 |
| KR | 2000-0049408 A | 8/2000 |
| KR | 2002-0046269 A | 6/2002 |
| KR | 2003-0016037 A | 2/2003 |
| WO | 2005/114439 | 12/2005 |

* cited by examiner

Primary Examiner — Son T Hoang
(74) Attorney, Agent, or Firm — H.C. Park & Associates, PLC

(57) ABSTRACT

Provided is a method of managing search mediation information, the method including: creating a count field corresponding to each piece of search mediation information; identifying an Internet Protocol (IP) address of a particular class, from which the user's search mediation information is received; determining whether the identified IP address is a count permission address; and increasing the indicator and storing the increased indicator in the count field corresponding to the search medium information in response to a determination that the identified IP address is a count permission address, and not increasing the indicator in response to a determination that the identified IP address is not a count permission address.

13 Claims, 5 Drawing Sheets

METHOD AND SYSTEM FOR MANAGING SEARCH MEDIATION INFORMATION

CROSS-REFERENCES TO RELATED APPLICATIONS

This application is a U.S. national phase application, pursuant to 35 U.S.C. §371, of PCT/KR2007/001214, filed Mar. 13, 2007, designating the United States and published on Sep. 20, 2007 as WO 2007/105899 A1, which claims priority to Korean application 10-2006-0024278, filed Mar. 16, 2006. The entire contents of the aforementioned patent applications are incorporated herein by this reference.

TECHNICAL FIELD

The present invention relates to a method and system for managing search mediation information, which can selectively count the number of inputs of search mediation information using a class-C Internet Protocol (IP) address, and create an input rank list or a popularity list associated with the search mediation information by referring to the counted number of inputs.

BACKGROUND ART

Recently, a search service provider provides a service which retrieves keywords, inputted from a plurality of users during a predetermined period of time, and provides the retrieved keywords to a user as popular keywords. The service of providing popular keywords may readily predict a field which the plurality of users are interested in, based upon a season, a social matter, and the like. Due to the advantage, the service is in a commercial spotlight.

As an example, when the number of inputs with respect to a keyword 'good pension' has been significantly increased during the previous week, a search service operator may select the keyword 'good pension' as a popular keyword and provide the keyword 'good pension' to users.

However, although a user or a group of users, which are in a commercial relation in association with the keyword 'good pension', abusively inputs the keyword 'good pension', the search service operator may regard the keyword 'good pension' as a popular keyword without identifying if all of them are valid. Accordingly, the user or the group of users may acquire some benefits by maliciously utilizing the popular keyword service. The above-described example represented a case of abuse of the popular keyword service. The more the cases of abuse increases, the more users' distrust towards the popular keyword service may increase.

To solve the above-described problem, when the same keyword is continuously inputted using a single Internet Protocol (IP) address, an improved search service identifies the keyword as an abusively inputted keyword and ignores such abusive inputs in selecting popular keywords.

However, when a user or users abusively input the same keyword while changing the host address of the terminal it or they use, even the improved search service may not identify the invalidity of such inputs. As an example, when a group with malicious intent abusively inputs the same keyword using a plurality of terminals with IP addresses having different host addresses, the improved search service may not identify the invalidity.

As described above, the conventional search service may not effectively identify invalid inputs.

Accordingly, there is a need for a model of managing search mediation information, which can identify an IP address of a keyword input terminal as a particular class grade, and also identify terminals, abusively inputting the same keyword, by a network unit and thereby can more accurately determine invalidity of such inputs.

SUMMARY OF THE DISCLOSURE

An aspect of the present invention provides a method and system for managing search mediation information which can identify terminals, by a network unit, generating invalid inputs with respect to the same keyword.

Another aspect of the present invention also provides a method and system for managing search mediation information, which can readily identify invalid inputs, using a class-C Internet Protocol (IP) address, which are generated in a network with a predetermined size. In this instance, the class-C IP address is assigned to a user terminal that accesses a search engine.

Another aspect of the present invention also provides a method and system for managing search mediation information, which can count the number of inputs every time search mediation information is inputted, create statistical data about the search mediation information by referring to the counted number of inputs, and also delete search mediation information if it is determined to have been abusively inputted, and thereby can reduce a change in a structure of creating the statistical data and also can accurately calculate the statistical data.

According to an aspect of the present invention, there is provided a method of managing search mediation information, the method including the steps of: creating a count field corresponding to each search mediation information; identifying an Internet Protocol (IP) address of a particular class, associated with an input of the search mediation information, when the search mediation information is inputted into a search engine; determining whether the identified IP address is a count permission address; and counting and storing a number of inputs in the count field corresponding to the search medium information when the IP address is determined as the count permission address.

According to another aspect of the present invention, there is provided a method of managing search mediation information, the method including the steps of: creating a query count field and a count field corresponding to each search mediation information; counting and storing a number of query inputs in the query count field corresponding to the search mediation information when the search mediation information is inputted into a search engine; identifying a class-C IP address associated with an input of the search mediation information; determining whether the identified class-C IP address is identical to a second class-C IP address stored in an address storage space corresponding to the search mediation information; counting and storing a number of correction inputs in the count field corresponding to the search mediation information when the identified IP address is different from the second IP address; comparing the number of query inputs, stored in the query count field, with a corrected number of inputs stored in the count field at a predetermined point in time, and calculating a difference value therebetween; and performing a predetermined process with respect to the search mediation information when the calculated difference value satisfies a predetermined numerical value.

According to still another aspect of the present invention, there is provided a computer-readable recording medium storing a program for implementing the methods.

According to yet another aspect of the present invention, there is provided a system for managing search mediation information, the system comprising: a count field configured to correspond to each search mediation information; an IP address identification component configured to identify an IP address of a particular class, associated with an input of the search mediation information, when the search mediation information is inputted into a search engine; a determination component configured to determine whether the identified IP address is a count permission address; and a count storage component configured to count and store a number of inputs in the count field corresponding to the search medium information when the IP address is determined as the count permission address, wherein the IP address identification component identifies a class-C IP address.

According to a further aspect of the present invention, there is provided a system for managing search mediation information, the system comprising a query count field configured to correspond to the search mediation information, and count and store a number of query inputs when the search mediation information is inputted into a search engine; an IP address identification component configured to identify a class-C IP address associated with an input of the search mediation information; a determination component configured to determine whether the identified class-C IP address is identical to a second class-C IP address stored in an address storage space corresponding to the search mediation information; and a count field configured to correspond to the search mediation information, and count and store a number of correction inputs when the identified IP address is different from the second IP address, wherein the search engine compares the number of query inputs stored in the query count field with a corrected number of inputs stored in the count field at a predetermined point in time, and calculates a difference value therebetween, and performs a predetermined process with respect to the search mediation information when the calculated difference value satisfies a predetermined numerical value.

The above and other features will be described in detail infra.

DETAILED DESCRIPTION OF THE PREFERRED EMBODIMENTS

Figure 1:
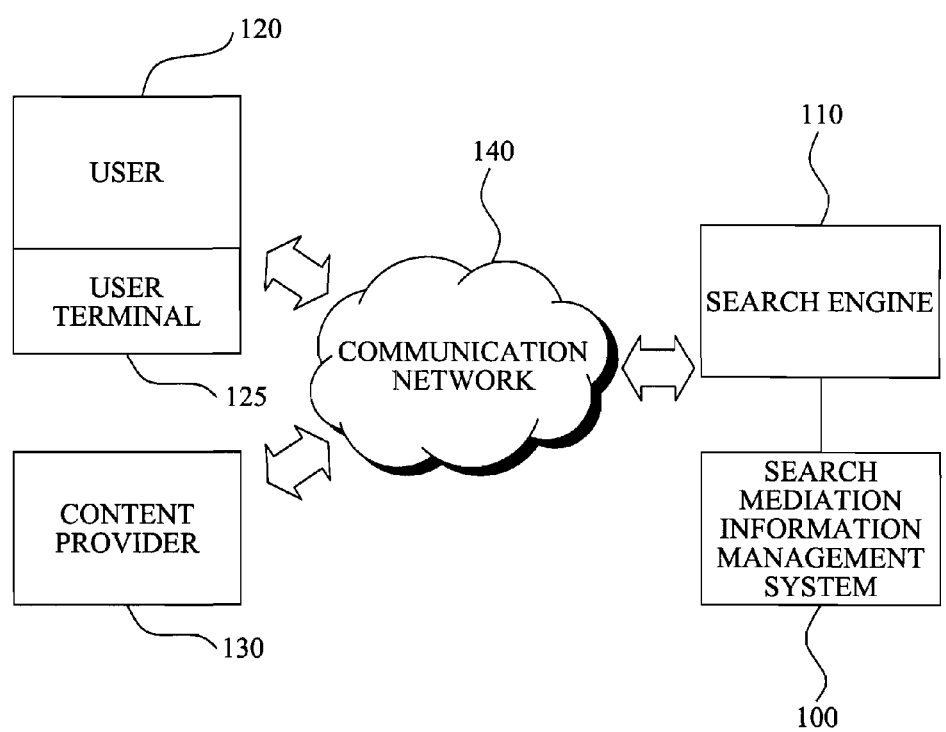
FIG. 1 illustrates a configuration of a system for managing search mediation information according to an exemplary embodiment of the present invention.

Reference will now be made in detail to embodiments of the present invention, examples of which are illustrated in the accompanying drawings, wherein like reference numerals refer to the like elements throughout. The embodiments are described below in order to explain the present invention by referring to the figures.

The term "Internet Protocol" or "IP" used throughout the present specification may indicate a unique identification address which is assigned to a network connecting with a communication network, such as the Internet, and the like, and a host connecting with the network. In this instance, the host includes a user terminal, a service server, and the like. The IP address is processed using 32 bits, that is, 4 bytes, in the network or the host. However, when the IP address is indicated, the IP address is indicated by separating four decimal numbers using dot (.). Specifically, the IP address may be indicated by separating four decimal numbers using dot, for example, '203.172.112.72'.

The IP address may be classified into a class-A, a class-B, and a class-C, depending upon the size of a network, that is, the number of hosts connecting with the network. In this instance, the IP address may be classified based on the number of bits on a portion indicating a network address and another portion indicating a host address.

The class-A IP address includes a 7-bit network address and a 24-bit host address, and may be used in a network connecting with a great number of hosts. The class-A IP address is expressed as "network address.host address.host address.host address." A total of 126 networks may be created using the class-A IP address and about 16,770,000 nodes may connect with each of the networks.

Also, the class-B IP address includes a 14-bit network address and a 16-bit host address, and also may be used in a network connecting with a great number of hosts. The class-B IP address is expressed as "network address.network address.host address.host address." A total of 16,382 networks may be created using the class-B IP address and about 65,000 nodes may connect with each of the networks.

Also, the class-C IP address includes a 21-bit network address and an 8-bit host address, and may be used in a plurality of networks connecting with a comparatively smaller number of hosts. The class-C IP address is expressed as "network address.network address.network address.host address." A total of 2,097,150 networks may be created using the class-C IP address and 254 nodes may connect with each of the networks.

Also, the IP address may be classified into a class-D for multicast, a class-E, which is a special class reserved for future purposes and is currently unused, and the like.

The system for managing search mediation information according to the present exemplary invention selectively counts the number of inputs with respect to search mediation information using the class-C IP address, and creates an input rank list or a popularity list associated with the search mediation information by referring to the counted number of inputs. In this instance, the class-C IP address may be used to readily find whether an input of the search mediation information corresponds to an invalid input in a network with a predetermined size.

FIG. 1 illustrates a configuration of a system for managing search mediation information according to an exemplary embodiment of the present invention.

A search mediation information management system 100 functions to count the number of inputs with respect to search mediation information, and provide an input rank list or a popularity list associated with the search mediation information to a user 120. In this instance, the search mediation information is inputted from the user 120 accessing a search engine 110, and the input rank list or the popularity list is created using the number of accumulated inputs during a predetermined period of time.

Particularly, in the present exemplary embodiment, the search mediation information management system 100 may improve the credibility of the number of inputs by determining whether an IP address, more particularly, a class-C IP address is an address that can be counted as a valid address ("count permission address"), and selectively counting the number of inputs with respect to search mediation information. In this instance, the IP address is assigned to a user terminal 125 when the user terminal 125 accesses the search engine 110 to input the search mediation information.

Also, the search engine 110 may indicate a search program or a service server to connect the user 120 with a website of a content provider 130. In this instance, the content provider 130 maintains contents in a format of text/audio/video, and the like, that the user 120 desires to retrieve or realize. A search operation using the search engine 110 is to acquire search mediation information, such as a keyword, a site identifier, for example, a Universal Resource Locator (URL), a link address, and the like which the user 120 inputs on a search page. Also, the search operation is to provide the user's 120 desired content to the user or to induce the user 120 to a predetermined website by using the acquired search mediation information.

As an example, the search engine 110 may display a search window, an address window, and brief information associated with the content on the search page for the user 120. In this instance, the user 120 may input the keyword or the site identifier (URL) into the search window or the address window and click the brief information and thereby acquire a link address.

Specifically, the search engine 110 functions to display brief information of the content provider 130 on the search page and connect the user 120 with the particular content provider 130 using a link address of the brief information when the user 120 clicks the brief information. In this instance, the content provider 130 may provide the user with the user's 120 desired content in response to a search request from the user 120. Also, the search engine 110 may directly connect the user 120 and the content provider 130 which is specified by the site identifier inputted into the address window. As described above, the user 120 may access the content provider 130 via the search engine 110 and receive the desired content from the content provider 130 via the user terminal 125.

The user 120 may indicate an Internet user who maintains the user terminal 125 to connect with the search mediation information management system 100, and generates the search request by inputting search mediation information, associated with a desired content, on the search page. In this instance, the search page is displayed on the user terminal 125.

The content provider 130 may indicate a content provider (CP) which operates a particular website of which location is specified in a network by the site identifier (URL) or the link address.

The user terminal 125 functions to maintain a connection state with the search mediation information management system 100 via a communication network 140, such as the Internet and the like, and display the search page, provided by the search engine 110 or the content, retrieved by the search engine 110, for the user 120 in response to the search request. Also, the user terminal 125 may display the input rank list or the popularity list about search mediation information created by the search mediation information management system 100. Accordingly, the user terminal 125 may display various types of statistical data for the user 120.

Also, the search mediation information management system 100 functions to count only a valid input by determining whether an input of search mediation information corresponds to an invalid abusive input so as to create accurate statistical data. In this instance, the search mediation information is used to create the statistical data associated with the search.

Particularly, the search mediation information management system 100 classifies an IP address of the user terminal 125, inputting the search mediation information, as the class-C and thus readily identifies an invalid input which occurs in a network with a predetermined size. Accordingly, the search mediation information management system 100 excludes the input of search mediation information, which is determined as the invalid input, from the number of inputs with respect to the search mediation information. Hereinafter, a configuration of a search mediation information management system 200 will be described.

Figure 2:
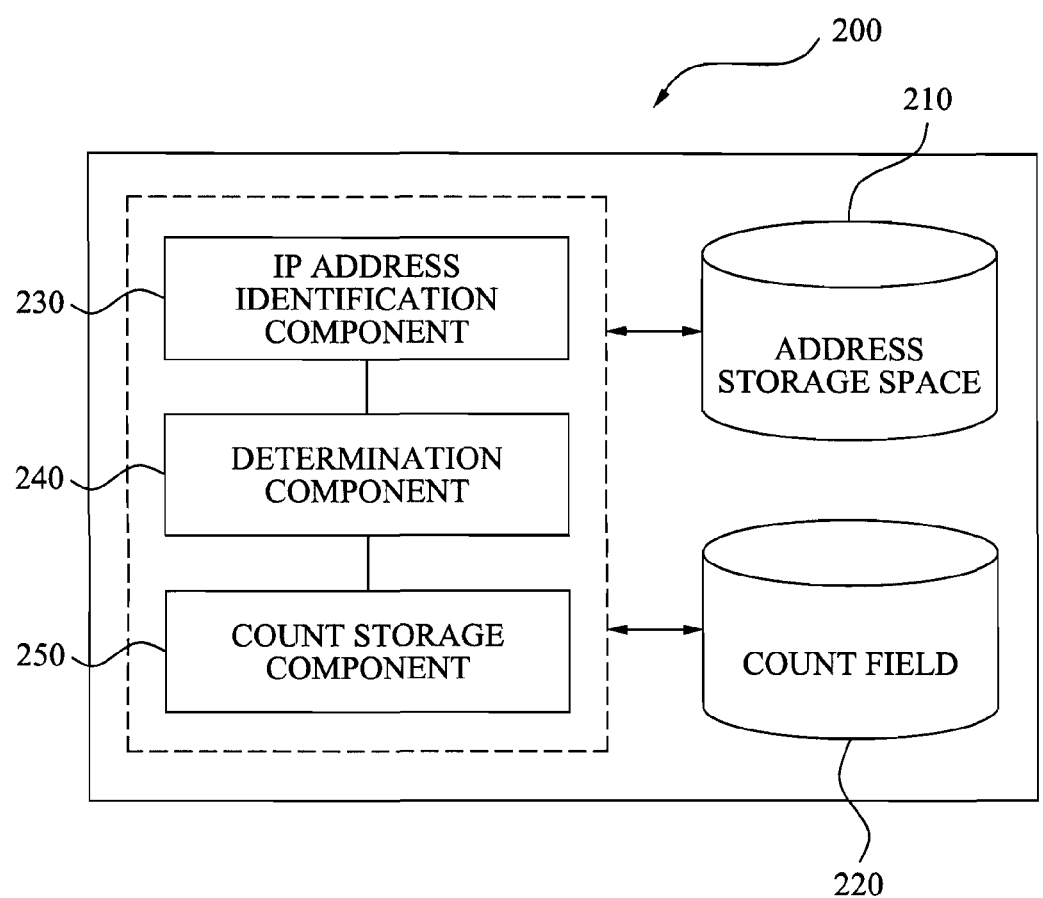
FIG. 2 is a block diagram illustrating a configuration of a system for managing search mediation information according to an exemplary embodiment of the present invention.

FIG. 2 is a block diagram illustrating a configuration of a system for managing search mediation information according to an exemplary embodiment of the present invention.

The search mediation information management system 200 may include a count field 220, an IP address identification component 230, a determination component 240, and a count storage component 250.

The search mediation information management system 200 identifies an IP address, assigned to the user terminal 125 when the user terminal 125 accesses the search engine 110 to input search mediation information, and stores the identified IP address in an address storage space 210 corresponding to the search mediation information. In this instance, the address storage space 210 functions to store the IP address assigned to the user terminal 125 in association with an input of search mediation information. Also, as a class of the IP address stored in the address storage space 210, the class-C IP address may be selectively stored for a purpose of the present invention of being able to readily determine an invalid input which occurs in a network with a predetermined size.

The count field 220 corresponds to each search mediation information, and stores a predetermined numerical value associated with the number of inputs with respect to search mediation information when the search mediation information is inputted into the search engine 110. In the present exemplary embodiment, the count field 220 stores only the number of inputs excluding the number of invalid inputs, instead of storing the total number of valid and invalid inputs with respect to the search mediation information that is inputted into the search engine 110 or in the search page provided from the search engine 110. Specifically, depending upon the purpose of the present invention, the count field 220 counts the number of valid inputs and stores the counted number of valid inputs.

The address storage space 210 or the count field 220 may reset the stored numerical value information at a predetermined time interval, and thereby store information about the number of inputs with respect to search mediation information or the class-C IP address during a particular period of time. Accordingly, the search mediation information management system 200 may include information about a periodic input status of search mediation information in the input rank list or the popularity list and thereby create the input rank list or the popularity list.

The search mediation information may indicate a keyword or a site identifier (URL) to input into a search window or an address window, or a link address associated with the user's 120 click on brief information. The search window or the address window is included in a search page displayed for the user 120 when the user 120 accesses the search engine 110.

As an example, when a valid input of a keyword 'new year' is input into a search window of a search page during one week after Dec. 25, 2005, the input is stored as a valid input in the count field 220 corresponding to the keyword 'new year'. Through the above operation, the count field 220 may store the number of inputs for the keyword 'new year' which are counted by the search mediation information management system 200.

Also, when a valid input of a site identifier 'www.naver.com' is input into an address window of the search page according to a search service, the input is stored in the count field 220 corresponding to the site identifier 'www.naver.com'. Through the above operation, the count field 220 may store the number of inputs for the site identifier 'www.naver.com' which are counted by the search mediation information management system 200.

Also, when brief information associated with the user's 120 desired content is displayed on the search page and then the user 120 clicks the brief information, a link address 'http://news.naver.com/hotissue/read.php~' may be extracted, and the total number of times that the link address "http://news.naver.com/hotissue/read.php~" is extracted, that is, the total number of inputs of the site identifier, may be stored in the count field 220 corresponding to the link address 'http://news.naver.com/hotissue/read.php~'.

The IP address identification component 230 identifies an IP address of a particular class, associated with an input of the search mediation information when the search mediation information is inputted into the search engine 110 or the search page. More specifically, the IP address identification component 230 identifies the class-C IP address which is assigned to the user terminal 125 when the user terminal 125 accesses the search engine 110. As an example, when an IP address '203.172.112.72' is assigned to the user terminal 125 accessing the search engine 110, the IP address identification component 230 may identify '203.172.112.72' associated with the network address, based on the structure of the class-C IP address, that is, [network address.network address.network address.host address].

The determination component 240 determines whether the identified IP address is a count permission address. Specifically, the determination component 240 functions to determine whether an input of search mediation information in the search engine 110 or the search page corresponds to an invalid input. Accordingly, the determination component 240 may verify whether the identified class-C IP address is identical to a second class-C IP address stored in the address storage space 210. When the identified IP address is identical to the second IP address, the determination component 240 may determine that a current input of search mediation information corresponds to an invalid input which is inputted from the user terminal 125 accessing the same network.

Conversely, when the identified IP address is different from the second IP address, the determination component 240 may determine a current input of search mediation information as a valid input, and thereby determine the identified IP address as a count permission address.

Also, the determination component 240 may perform a process of determining whether the IP address is identical to the second IP address only within a particular period of time by using time information stored in the address storage space. Accordingly, when search mediation information is inputted from the same network, however, after certain time intervals, the determination component 240 may determine an input of the search mediation information as a valid input.

Also, when the determination component 240 determines the class-C IP address associated with the user terminal 125, inputting the search mediation information, as the count permission address, the count storage component 250 counts (+1) and stores the number of inputs in the count field 220 corresponding to the search mediation information. Specifically, the count storage unit 250 counts only a valid input with respect to search mediation information and stores a counted number of inputs in the count field 220.

Therefore, according to the present invention, it is possible to readily identify invalid inputs, which are generated in a network with a predetermined size, using a class-C IP address, and exclude the invalid inputs to get the total number of valid inputs. Accordingly, it is possible to accurately count the number of valid inputs with respect to search mediation information. In this instance, the class-C IP address is assigned to a user terminal that accesses a search engine.

The search mediation information management system 200 may create an input rank list about a keyword/site identifier (URL), which is frequently inputted during a predetermined period of time, or a popularity list about the content provider 130 selected by the plurality of users 120, based on the number of inputs with respect to each search mediation information stored in the count field 220. In this instance, the created input rank list or the popularity list may be displayed on the user terminal 125 for the user 120 when the user terminal 125 accesses the search engine 110.

Specifically, the search mediation information management system 200 may exclude the number of invalid inputs from the total number of inputs with respect to search mediation information and thus create accurate statistical data about the search mediation information. As an example, the search mediation information management system 200 may provide the user 120 with a detailed current status about popular keywords, which are recently inputted from a plurality of users 120, using the input rank list.

Figure 3A:
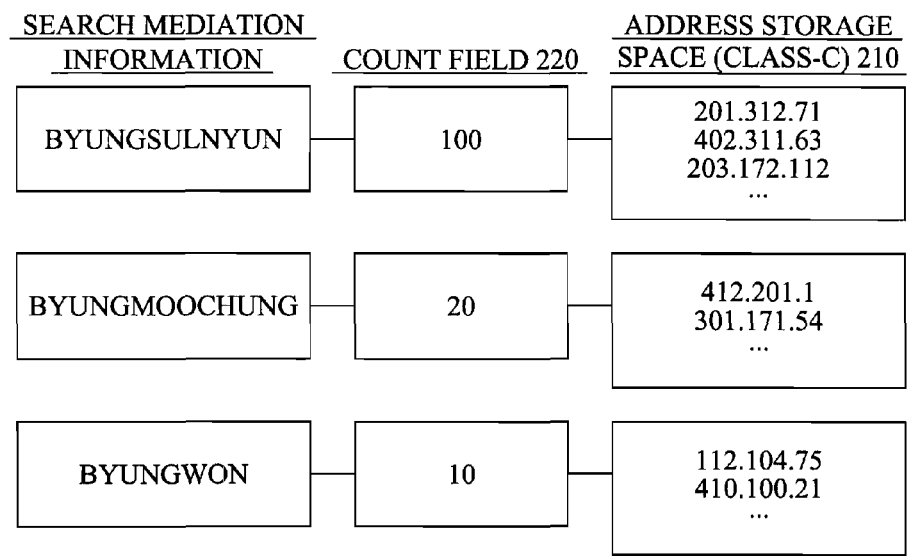
FIGS. 3A and 3B illustrate an example of counting a valid input of search mediation information according to an exemplary embodiment of the present invention.
Figure 3B:
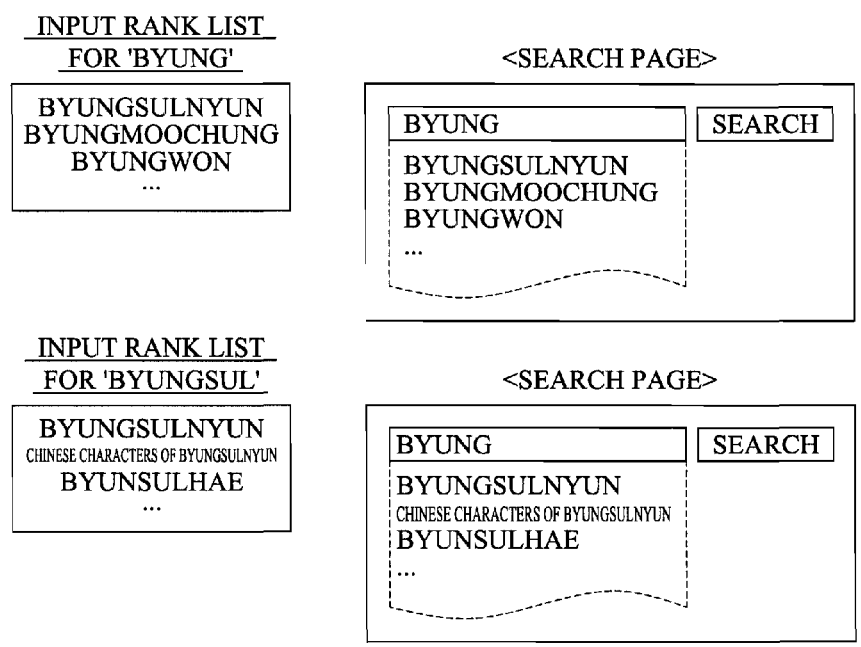

FIGS. 3A and 3B illustrate an example of counting a valid input of search mediation information according to an exemplary embodiment of the present invention.

As described above, the search mediation information management system 200 functions to identify the class-C IP address with respect to the IP address, assigned to the user terminal 125 when the user terminal 125 accesses the search engine 110, and also identify an invalid input.

FIGS. 3A and 3B illustrate an example of a popularity rank list displayed for the user 120 when the user terminal 125 with the IP address '203.172.112.72' accesses the search engine 110, and the user 120 inputs a keyword 'BYUNGSULNYUN' (the Year of Dog in English) corresponding to search mediation information into a search window of the search engine 110.

In FIG. 3A, an address storage space 210 and a count field 220 corresponding to an individual keyword are shown. Referring to FIG. 3A, search mediation information was inputted into the search engine 110 during a period of time from 2005-12-31 to 2006-01-01, and information associated with the search mediation information was stored in the address storage space 210 and the count field 220. As shown in FIG. 3A, the search mediation information management system 200 may store the class-C IP address, which is assigned to the user terminal 125 when the user terminal 125 accesses the search engine 110, count the number of inputs of search mediation information, which are determined valid, and store the counted number of inputs in the count field 220. Hereinafter, the IP address stored in the address storage space 210 is referred to as a second IP address.

The address storage space 210 corresponding to the keyword 'BYUNGSULNYUN' stores IP addresses, such as '201.312.71', and the like, in class-C, assigned to the user terminal 125 inputting the keyword 'BYUNGSULNYUN' during the period of time. Also, the count field 220 corresponding to the keyword 'BYUNGSULNYUN' stores 100 as the number of inputs for the keyword 'BYUNGSULNYUN', which is determined as a valid input.

In this circumstance, when the user terminal 125 accesses the search engine 110 and inputs the keyword 'BYUNGSUL-NYUN' during the period of time from 2005-12-31 to 2006-01-01, the search mediation information management system 200 may identify the class-C IP address assigned to the user terminal 125, that is, '203.172.112'. Next, the search mediation information management system 200 may search the address storage space 210 corresponding to the keyword 'BYUNGSULNYUN', and determine whether the identified class-C IP address, '203.172.112', is stored as the second IP in the address storage space 210. Specifically, the search mediation information management system 200 determines whether the IP address '203.172.112' is identical to the second IP address. When the identified IP address '203.172.112' is stored in the address storage space 210, that is, when the IP address is identical to the second IP address, the search mediation information management system 200 determines the input of the keyword 'BYUNGSULNYUN' as an invalid input and does not count the input. Conversely, when the identified IP address '203.172.112' is not stored in the address storage space 210, that is, when the IP address '203.172.112' is different from the second IP address, the search mediation information management system 200 may determine a current input of the keyword 'BYUNGSULNYUN' as a valid input of a count permission address, and thereby increase the number of inputs in the count field 220 by +1.

In FIG. 3B, the search mediation information management system 200 creates an input rank list by referring to the count field 220, and displays the created input rank list on the user terminal 125. The count field 220 stores the number of inputs with respect to search mediation information which were counted by the search mediation information management system 200 during the period of time from 2005-12-31 to 2006-01-01.

As an example, when the user 120 desires to input the keyword 'BYUNGSULNYUN' into the search window of the search page at a predetermined point in time after 2006-01-01 elapses, the search mediation information management system 200 may create the input rank list by referring to the number of inputs stored in the count field 220 shown in FIG. 3A in interoperation with a consonant/vowel input of a keyword, and display the created input rank list for the user 120.

As an example, when the user 120 inputs 'BYUNG' of the keyword 'BYUNGSULNYUN', the search mediation information management system 200 may retrieve keywords, 'BYUNGSULNYUN', 'BYUNGMUCHUNG', 'BYUNG-WON' and the like, including 'BYUNG' as a first syllable, and create an input rank list by referring to a number of inputs, stored in the count field 220 corresponding to each of the keywords. As shown in FIG. 3B, the search mediation information management system 200 may display the input rank list, associated with 'BYUNG', for the user 120 and thereby provide the user 120 with statistical data about keywords inputted from a plurality of users in association with 'BYUNG'.

The user 120 may sequentially input 'BYUNGSUL' or 'BYUNGSULNYUN' into the search window. In this instance, the search mediation information system 200 may create the input rank information about the keyword and display the created input rank information on the user terminal 125 for the user 120.

FIG. 3B illustrates an input rank list, which is created in association with a number the number of inputs of a predetermined keyword, which is inputted from a plurality of users based on a consonant/vowel input of the keyword during a predetermined period of time. However, it may be apparent to those of ordinary skills in the art that an input rank list associated with the number of inputs of a site identifier inputted into the address window of the search webpage or a number of inputs of a link address, which is inputted when the user 120 clicks brief information displayed on the search page.

According to another exemplary embodiment of the present invention, with respect to one search mediation information, the search mediation information management system 200 acquires a corrected number of inputs by subtracting the number of invalid inputs from the number of inputs (hereinafter, the number of query inputs) which are counted every time the search mediation information is inputted into the search engine 110, and compares the number of query inputs with the corrected number of inputs, and calculates a difference value therebetween. When the difference value is a predetermined numerical value, the search mediation information is deleted from the created input rank list.

For the above operation, the search mediation information management system 200 may further include a query count field for storin the number of query inputs. Also, when particular search mediation information is inputted into the search engine 110, the search mediation information management system 200 counts and stores the number of inputs in the query count field. Also, the search mediation information management system 200 stores the corrected number of inputs in the count field 220. In this instance, the corrected number of inputs is acquired by identifying the invalid input based on the class-C IP address and selectively counting an input of search mediation information.

As described above, the number of query inputs is calculated irrespective of invalid inputs, while the corrected number of inputs is obtained in consideration of invalid inputs. The search mediation information management system 200 creates the input rank list about the search mediation information by using the number of input queries. Creating of the input rank list will be the same as the descriptions made with reference to FIG. 3.

At a predetermined period of time, the search mediation information management system 200 calculates the difference value between the number of query inputs and the corrected number of inputs with respect to particular search mediation information. When the calculated difference value is meets a predetermined condition, the search mediation information management system 200 determines the input of the search mediation information management system as an invalid input and deletes the search mediation information from the created input rank list. As an example, when the condition is set such that the calculated difference values be higher than or equal to 100, and the number of query inputs for the keyword 'BYUNGSULNYUN' is '1,000', but the corrected number of inputs is '100', the search mediation information management system 200 may determine the difference value satisfies the condition, and identify the input of the keyword 'BYUNGSSULNYUN' as the invalid input.

Accordingly, the search mediation information management system 200 may delete the keyword 'BYUNGSUL-NYUN' from the input rank list which is created by referring to the number of query inputs, and provide the user 120 with the input rank list including more accurate statistical data.

Therefore, according to the present invention, it is possible to count the number of inputs every time search mediation information is inputted, create statistical data about the search mediation information by referring to the counted number of inputs, and also delete search mediation information, which is determined to be abusively inputted, and thereby to reduce a change in a structure of creating the statistical data and also to accurately calculate the statistical data.

Hereinafter, an operational flow of a system for managing search mediation information according to an exemplary embodiment of the present invention will be described in detail with reference to FIG. 4.

Figure 4:
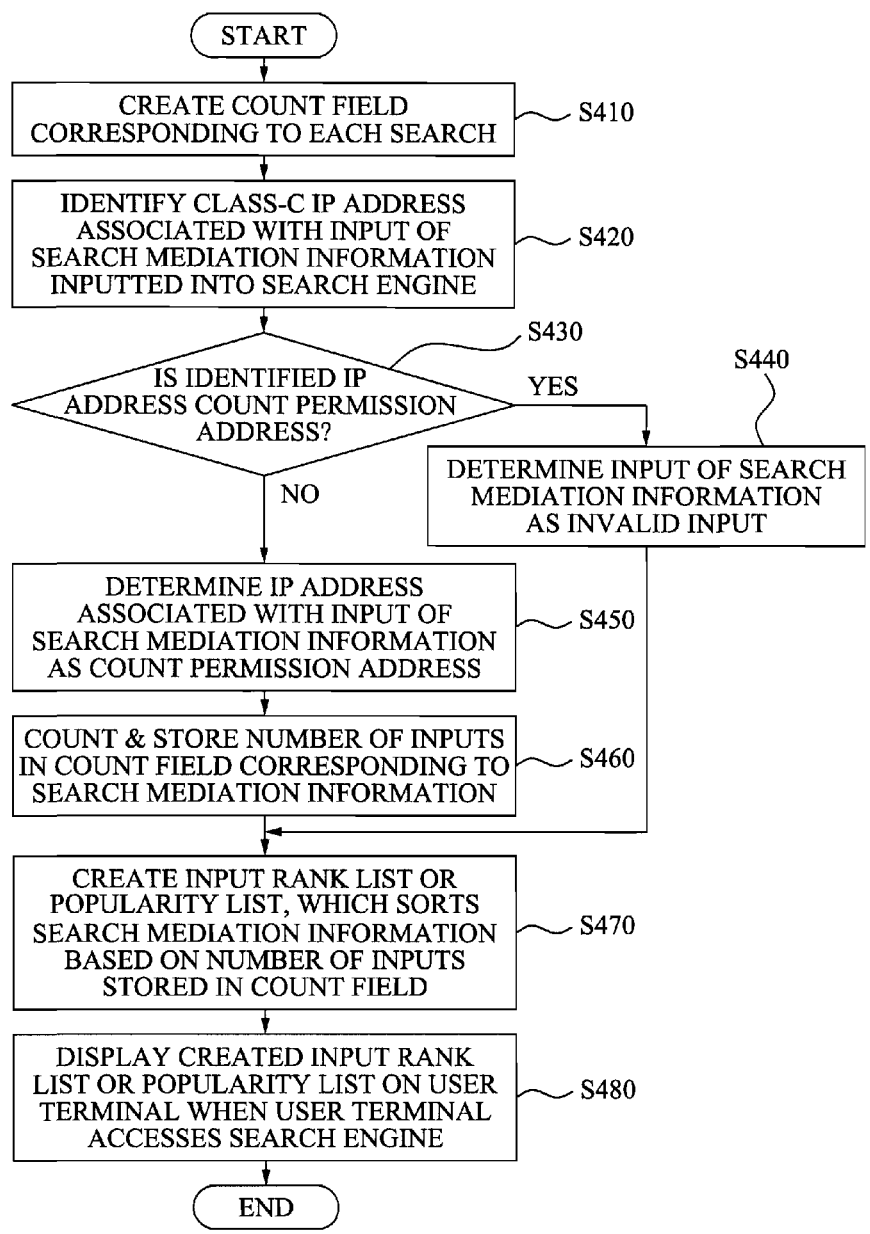
FIG. 4 is a flowchart illustrating a method of managing search mediation information according to an exemplary embodiment of the present invention.

FIG. 4 is a flowchart illustrating a method of managing search mediation information according to an exemplary embodiment of the present invention.

The method of managing search mediation information may be performed by the search mediation information management system 200 as described above.

In operation S410, the search mediation information management system 200 creates a count field corresponding to each search mediation information. Operation 5410 is a process of counting and storing the number of inputs that particular search mediation information is inputted into the search engine 110. Particularly, the count field 220 stores the number of inputs excluding the number of inputs determined as invalid. Also, the count field 220 may reset the number of inputs to '0' at a predetermined time interval, and thereby separately store information about the input of search mediation information, which occurred during a particular time interval.

In operation S420, the search mediation information management system 200 identifies an IP address of a particular class, associated with an input of the search mediation information, when the search mediation information is inputted into the search engine 110. Operation S420 is a process of identifying a class-C IP address, assigned to the user terminal 125 when the user terminal accesses the search engine 110 to input the search mediation information.

In operation S430, the search mediation information management system 200 determines whether the identified IP address is a count permission address. Operation S430 is a process of searching the address storage space 210 for a second class-C IP address associated with the user terminal 125, and comparing the identified class-C IP address with the retrieved second class-C IP address. In this instance, the user terminal 125 has previously accessed the search engine 125 to input the search mediation information.

In operation S440, when the identified IP address is identical to the second IP address, that is, in the case of yes direction of operation S430, the search mediation information management system 200 determines the input of search mediation information which is one of invalid inputs repeatedly inputted from a plurality of user terminals connecting with the same network. Accordingly, the search mediation information management system 200 excludes the input of search mediation information determined as the invalid input, and maintains the numerical value, that is, the number of inputs stored in the count field 220 corresponding to the search mediation information.

Conversely, in operation S450, when the identified IP address is different from the second IP address, that is, in the case of no direction of operation S430, the search mediation information management system 200 determines the IP address, associated with the input of search mediation information, as the count permission address. In operation S460, the search mediation information management system 200 counts and stores the number of inputs in the count field 220 corresponding to the search mediation information. Operations S450 and S460 are processes of counting the input of search mediation information, which is determined as valid, and increasing the numerical value stored in the count field 220 by 1 (+1) corresponding to the search mediation information.

In operation S470, the search mediation information management system 200 verifies the number of inputs corresponding to the search mediation information, and creates an input rank list or a popularity list, which includes the search mediation information based on the number of inputs. In this instance, the number of inputs is stored in the count field 220 during a predetermined period of time. Operation S470 is a process of creating an input rank list by extracting a keyword or a site identifier, which is comparatively frequently inputted during a predetermined period of time, or creating a popular list about the content provider 130 which connects a plurality of users and a link address when the plurality of users clicks brief information associated with the link address.

In operation S480, the search mediation information management system 200 displays the created input rank list or the popularity list on the user terminal 125 when the user terminal 125 accesses the search engine 110. Operation S480 is a process of providing the user 120 with accurate statistical data in which invalid inputs are excluded when the user 120 accesses the search engine 110 for a search operation, and thereby optimizing a selection of search mediation information.

Therefore, according to the present invention, it is possible to readily identify invalid inputs, which are generated in a network with a predetermined size, using a class-C IP address. In this instance, the class-C IP address is assigned to a user terminal when the user terminal accesses a search engine. Also, it is possible to exclude invalid inputs in calculating the number of inputs and thereby more accurately count the number of inputs with respect to search mediation information.

The exemplary embodiments of the present invention include computer-readable media including program instructions to implement various operations embodied by a computer. The media may also include, alone or in combination with the program instructions, data files, data structures, tables, and the like. The media and program instructions may be those specially designed and constructed for the purposes of the present invention, or they may be of the kind well known and available to those having skill in the computer software arts. Examples of computer-readable media include magnetic media such as hard disks, floppy disks, and magnetic tape; optical media such as CD ROM disks; magneto-optical media such as floptical disks; and hardware devices that are specially configured to store and perform program instructions, such as read-only memory devices (ROM) and random access memory (RAM). The media may also be a transmission medium such as optical or metallic lines, wave guides, etc. including a carrier wave transmitting signals specifying the program instructions, data structures, etc. Examples of program instructions include both machine code, such as produced by a compiler, and files containing higher level code that may be executed by the computer using an interpreter.

According to the present invention, there is provided a method and system for managing search mediation information, which can readily identify invalid inputs, using a class-C IP address, which are generated in a network with a predetermined size. In this instance, the class-C IP address is assigned to a user terminal that accesses a search engine.

Also, according to the present invention, there is provided a method and system for managing search mediation information, which can count the number of inputs every time search mediation information is inputted, create statistical data about the search mediation information by referring to the counted number of inputs, and also delete search mediation information, which is determined to be abusively inputted, and thereby can reduce a change in a structure of creating the statistical data and also can accurately calculate the statistical data.

Also, according to the present invention, there is provided provides a method and system for managing search mediation information which can identify terminals, by a network unit, generating invalid inputs with respect to the same keyword.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

The invention claimed is:

1. A method of managing search mediation information, the method comprising:
creating a count field corresponding to each piece of the search mediation information, wherein the search mediation information is received from a user for searching for data, and the count field comprising an indicator of a number of times that each piece of the search mediation information was received at a search engine;
identifying an Internet Protocol (IP) address of a particular class, from which the user's search mediation information is received;
determining whether the identified IP address is a count permission address; and
increasing the indicator and storing the increased indicator in the count field corresponding to each piece of the search mediation information in response to a determination that the identified IP address is a count permission address, and not increasing the indicator in response to the determination that the identified IP address is not a count permission address,
wherein the identifying comprises identifying a class-C IP address having a 21-bit network address and an 8-bit host address,
wherein the method further comprises storing the identified class-C IP address in an address storage space corresponding to the search mediation information, and
wherein the determining comprises:
verifying whether the identified class-C IP address is identical to a second class-C IP address stored in the address storage space; and
determining the identified IP address as the count permission address in response to a verification that the identified class-C IP address is different from the second class-C IP address.

2. The method of claim 1, further comprising:
retrieving the indicator corresponding to each piece of the search mediation information, wherein the indicator is stored in the count field during a period of time;
creating an input rank list or a popularity list by sorting multiple pieces of search mediation information based on their corresponding indicators; and
displaying the created input rank list or the created popularity list on a user terminal.

3. The method of claim 1, wherein the search mediation information indicates a site identifier or a keyword associated with a search operation, or a link address associated with display of content.

4. A non-transitory computer-readable recording medium storing a computer-executable program for implementing the method according to claim 1.

5. A method of managing search mediation information, the method comprising:
creating a query count field and a count field corresponding to each piece of the search mediation information;
increasing a number of query inputs and storing the increased number of query inputs in the query count field corresponding to each piece of the search mediation information in response to the search mediation information received at a search engine;
identifying a class-C IP address from which the search mediation information is received, wherein the identified class-C IP address having a 21-bit network address and an 8-bit host address;
determining whether the identified class-C IP address is identical to a second class-C IP address stored in an address storage space corresponding to the search mediation information;
increasing a number of corrected inputs and storing the increased number of corrected inputs in the count field corresponding to each piece of the search mediation information in response to a determination that the identified class-C IP address is different from the second class-C IP address; and
determining whether the search mediation information is abused based on a difference between the increased number of query inputs and the increased number of corrected inputs and providing an indication of whether the search mediation information is abused.

6. The method of claim 5, further comprising:
verifying the number of query inputs stored in the query count field corresponding to the search mediation information;
creating an input rank list or a popularity list by sorting multiple pieces of the search mediation information based on their corresponding numbers of query inputs; and
displaying the created input rank list or the created popularity list on a user terminal.

7. The method according to claim 6, further comprising:
comparing the number of query inputs stored in the query count field with a decreased number of corrected inputs stored in the count field at a point in time, and calculating a difference value therebetween; and
deleting the search mediation information from the input rank list or the popularity list in response to a result that the calculated difference value satisfies a numerical value.

8. A system for managing search mediation information, the system comprising:
a count field corresponding to each piece of the search mediation information and comprising a count indicative of a number of times that the search mediation information was received from a user;
an Internet Protocol (IP) address identification component configured to identify an IP address of a particular class, from which the search mediation information is inputted into a search engine;
a non-transitory computer-readable data storage medium to store the IP address of the particular class;
a determination component configured to determine whether the identified IP address is a count permission address; and
a count storage component configured to increase the count and store the increased count in the count field corresponding to each piece of the search mediation information in response to a determination that the identified IP address is the count permission address, wherein the IP address identification component is configured to identify a class-C IP address having a 21-bit network address and an 8-bit host address, wherein the system further comprises an address storage space configured to store the identified class-C IP address corresponding to the search mediation information, and wherein the determination component is configured to verify whether the identified class-C IP address is identical to a second class-C IP address stored in the address storage space, and is configured to determine the identified IP address as the count permission address in response to the identified class-C IP address is different from the second class-C IP address.

9. The system of claim 8, wherein the search engine is configured to verify the number of inputs stored in the count field during a period of time corresponding to each piece of the search mediation information, to create an input rank list or a popularity list to sort multiple pieces of search mediation information based on their corresponding numbers of inputs, and to display the created input rank list or the popularity list on a user terminal in response to the user terminal accessing the search engine.

10. The system according to claim 8, wherein the search mediation information comprises at least one of a site identifier, a keyword associated with a search operation, and a link address associated with display of content.

11. A system for managing search mediation information, the system comprising:
   a query count field corresponding to the search mediation information, and provided to increase a number of query inputs and store the increased number of query inputs in response to the search mediation information received at a search engine;
   an Internet Protocol (IP) address identification component configured to identify a class-C IP address having a 21-bit network address and an 8-bit host address from which the search mediation information is inputted into the search engine;
   a non-transitory computer readable data storage medium to store the identified class-C IP address;
   a determination component configured to determine whether the identified class-C IP address is identical to a second class-C IP address stored in an address storage space corresponding to the search mediation information; and
   a count field corresponding to the search mediation information, and provided to increase a corrected number of inputs and store the increased, corrected number of inputs in response to determining that the identified class-C IP address is different from the second class-C IP address,
   wherein the search engine is configured to compare the number of query inputs stored in the query count field with the corrected number of inputs stored in the count field at a point in time, to calculate a difference value therebetween, and to perform a process of elimination with respect to the search mediation information when the calculated difference value satisfies a numerical value.

12. The system of claim 11, wherein the search engine is configured to verify the number of query inputs stored in the query count field corresponding to the search mediation information, to create an input rank list or a popularity list resulting from sorting multiple pieces of the search mediation information based on their corresponding numbers of query inputs, and to display the created input rank list or the popularity list on a user terminal in response to the user terminal accessing the search engine.

13. The system of claim 12, wherein the search engine is configured to delete the search mediation information from the input rank list or the popularity list when the calculated difference value satisfies the numerical value.

* * * * *